United States Patent
Koda et al.

(10) Patent No.: US 10,570,961 B2
(45) Date of Patent: Feb. 25, 2020

(54) RETAINER FOR BEARING AND BEARING

(71) Applicant: NTN CORPORATION, Osaka (JP)

(72) Inventors: Tsuyoshi Koda, Shizuoka (JP);
Tomoyoshi Izutsu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/556,418

(22) PCT Filed: Feb. 17, 2016

(86) PCT No.: PCT/JP2016/054513
§ 371 (c)(1),
(2) Date: Sep. 7, 2017

(87) PCT Pub. No.: WO2016/143472
PCT Pub. Date: Sep. 15, 2016

(65) Prior Publication Data
US 2018/0106295 A1    Apr. 19, 2018

(30) Foreign Application Priority Data
Mar. 11, 2015  (JP) .................. 2015-048436

(51) Int. Cl.
*F16C 33/66*  (2006.01)
*F16C 33/41*  (2006.01)
(Continued)

(52) U.S. Cl.
CPC .......... *F16C 33/6681* (2013.01); *F16C 19/06* (2013.01); *F16C 33/3887* (2013.01);
(Continued)

(58) Field of Classification Search
CPC .... F16C 33/3887; F16C 33/41; F16C 33/414; F16C 33/416; F16C 33/418; F16C 33/6629; F16C 33/6681
See application file for complete search history.

(56) References Cited

U.S. PATENT DOCUMENTS 5,015,105 A * 5/1991 Ueno .................... F16C 33/416
                                                     384/526
6,416,230 B1 * 7/2002 Staudigel .............. F16C 33/416
                                                     384/470
(Continued)

FOREIGN PATENT DOCUMENTS

CN    101235851    8/2008
JP    2003-232361  8/2003
(Continued)

OTHER PUBLICATIONS

Translation of JP2001280352, corresponds to JP4017827, obtained Apr. 24, 2019.*

(Continued)

*Primary Examiner* — James Pilkington
(74) *Attorney, Agent, or Firm* — Wenderoth, Lind & Ponack, L.L.P.

(57) ABSTRACT

A retainer for a bearing is entirely formed into an annular shape and has a crown shape. The retainer includes pockets which are formed at a plurality of locations in a circumferential direction of the retainer and are each opened on a radially outer side and a radially inner side. The pockets retain balls being rolling elements so that the balls are rollable. A grease flow-in passage is provided between an inner surface of each of the plurality of pockets and each of the balls.

5 Claims, 9 Drawing Sheets

(51) Int. Cl.
*F16C 33/38* (2006.01)
*F16C 19/06* (2006.01)

(52) U.S. Cl.
CPC .......... *F16C 33/416* (2013.01); *F16C 33/418* (2013.01); *F16C 33/6629* (2013.01); *F16C 2380/26* (2013.01)

(56) References Cited

U.S. PATENT DOCUMENTS

| 8,292,512 | B2* | 10/2012 | Tanaka | F16C 33/416 |
| | | | | 384/470 |
| 2004/0071375 | A1* | 4/2004 | Beaumont | F16C 19/163 |
| | | | | 384/470 |

FOREIGN PATENT DOCUMENTS

| JP | 2003-239984 | | 8/2003 |
|---|---|---|---|
| JP | 2007-285506 | | 11/2007 |
| JP | 4017827 | * | 12/2007 |
| JP | 2009-281399 | | 12/2009 |
| JP | 4424092 | | 3/2010 |
| JP | 4636035 | | 2/2011 |
| JP | 2011-117609 | | 6/2011 |
| JP | 2011-202799 | | 10/2011 |
| JP | 2012-107764 | | 6/2012 |
| JP | 2013-68249 | | 4/2013 |
| WO | 2010/032577 | | 3/2010 |
| WO | WO2010137434 | * | 12/2010 |

OTHER PUBLICATIONS

International Search Report dated May 17, 2016 in International (PCT) Application No. PCT/JP2016/054513.
Nikkan Kogyo Shimbun Ltd., Nikkan Kogyo Shimbun, Publication, "Ball Bearing for Drive Motor", Feb. 27, 2015 with partial English translation.
Nikkei Inc., Nikkei Shimbun, Publication, "High-Speed Compatible Bearing NTN Designed for HV Motors", Mar. 4, 2015 with partial English translation.
NTN Corporation, "Developed 'Grease Lubricated High-Speed Deep-Groove Ball Bearing' for EV and HEV", http://www.ntn.co.jp/japan/news/new_products/news201500012.html, Mar. 4, 2015 with partial English translation.
Nikkei Business Publications, Inc., Article, http://techon.nikkeibp.co.jp/article/News/20150304/407341/?rt=nocnt, Mar. 4, 2015 with partial English translation.
International Preliminary Report on Patentability and Written Opinion of the International Searching Authority dated Sep. 12, 2017 in International (PCT) Application No. PCT/JP2016/054513.
Chinese Office Action dated Jul. 2, 2019 in corresponding Chinese Patent Application No. 201680014371.2 with English translation of Search Report.

* cited by examiner

RETAINER FOR BEARING AND BEARING

TECHNICAL FIELD

The present invention relates to a retainer for a bearing, and to a bearing.

BACKGROUND ART

In recent years, vehicles such as an electric vehicle (EV) and a hybrid electric vehicle (HEV) including an electric motor are increasing. For the purpose of improving the power efficiency of the EV and the HEV, an electric motor (motor) is used in high-speed rotation. Therefore, a bearing that is suitable for the high-speed rotation needs to be employed as a bearing for use with a motor main shaft.

Incidentally, as illustrated in FIG. 11, a related-art bearing (ball bearing) mainly includes an inner ring 2, an outer ring 3, a plurality of balls 4, and a retainer 5. The inner ring 2 has an inner raceway surface 2a formed in a radially outer surface of the inner ring 2. The outer ring 3 is arranged on an outer side of the inner ring 2 and has an outer raceway surface 3a formed in a radially inner surface of the outer ring 3. The plurality of balls 4 are interposed between the inner raceway surface 2a of the inner ring 2 and the outer raceway surface 3a of the outer ring 3 so as to be rollable. The retainer 5 made of resin is arranged between the inner ring 2 and the outer ring 3 and is configured to retain the balls 4 at equal intervals in a circumferential direction of the retainer 5. Any one of the outer ring 3 and the inner ring 2 is mounted to a stationary portion such as a housing, and another one of the outer ring 3 and the inner ring 2 is mounted to a rotary portion such as a rotary shaft.

As illustrated in FIG. 12A and FIG. 12B, the retainer 5 having a crown shape, which is arranged between the inner ring 2 and the outer ring 3, includes a main portion 5a and pairs of elastic pieces 5b. The main portion 5a has an annular shape. The pairs of elastic pieces 5b are integrally formed on one surface of the main portion 5a in an axial direction of the retainer 5 at equal intervals in the circumferential direction. The retainer 5 has pockets 5c, which are each formed so as to recess between each pair of elastic pieces 5b and are each opened on a radially outer side and a radially inner side of the retainer 5. The balls 4 are retained in the pockets 5c so as to be rollable.

Further, as illustrated in FIG. 11, on both sides of the inner ring 2 and the outer ring 3 in the axial direction, there are arranged sealing members 6 configured to seal an annular space formed between the inner ring 2 and the outer ring 3. Each sealing member 6 includes a core 6a and an elastic member 6b. The elastic member 6b integrally adheres to the core 6a through vulcanization. A base end portion of each sealing member 6 is mounted to a radially inner end portion of the outer ring 3, and a distal end portion of each sealing member 6 has a seal lip 6c held in contact with a radially outer end portion of the inner ring 2. In the ball bearing 1 illustrated in FIG. 11, the outer ring 3 to which the base end portions of the sealing members 6 are mounted is on a stationary side, and the inner ring 2 with which the seal lips 6c are held in contact is on a rotary side.

During operation of the ball bearing 1, the inner ring 2 is rotated while maintaining a state in which the seal lips 6c formed at the distal ends of the sealing members 6 are held in slide contact with the radially outer end portion of the inner ring 2. With this action, entry of foreign matters such as water and dust into the bearing or leakage of a lubricant such as grease from an inside of the bearing to an outside is prevented.

When such a bearing is used in high-speed rotation, the retainer made of resin may be deformed by a centrifugal force and generate abrasion powder through interference with other components. As a result, abnormal heat generation is concerned, and there is a fear in that lifetime is shortened. Therefore, there have hitherto been proposed various solutions for the above-mentioned problem using the centrifugal force generated at the time of high-speed rotation (Patent Literature 1 to Patent Literature 4).

According to a retainer disclosed in Patent Literature 1, the retainer includes an annular portion and a plurality of cantilevered columnar portions extending from one side surface of the annular portion. Balls are received in pockets, which are each formed between the annular portion and adjacent columnar portions, so as to be rollable. In consideration of radial deformation caused by a centrifugal force, the retainer has the structure of being inclined radially inward from the annular portion toward the distal end portions of the columnar portions by a predetermined amount of deformation caused by the centrifugal force in advance. With this structure, when deformation caused by the centrifugal force occurs during high-speed rotation, the inclination is corrected, and the columnar portions are brought into a substantially horizontal state in the axial direction, thereby achieving suitable contact positions of the balls with respect to the pockets of the retainer.

According to a retainer disclosed in Patent Literature 2, in a combination retainer made of synthetic resin, when hook portions being engaging portions of a second element and step portions being engaged portions of a first element are engaged with each other, elastic deformation of the engaging portions is reduced or eliminated. Further, under the state in which both elements are engaged with each other, fixing pieces for filling gaps with protruding portions are inserted to through holes, and both the elements are integrally fixed to each other by the fixing pieces, thereby enhancing engagement between both the elements.

According to Patent Literature 3, as illustrated in FIG. 1 of Patent Literature 3, recessed portions (thinned portions) are formed in a radially inner portion of a crown-shaped retainer, thereby preventing abutment against a portion of each ball with high rotation speed during high-speed rotation. That is, the portion of interference between an inner wall surface, which constructs pockets of the crown-shaped retainer, and each ball.

According to Patent Literature 4, a support ring, which is formed of an annular metal plate having a rigidity higher than that of synthetic resin of a crown-shaped retainer for a ball bearing, is integrally fixed to the crown-shaped retainer through adhesion or the like. With this configuration, the rigidity of the retainer is enhanced. Further, according to a retainer for a bearing disclosed in Patent Literature 5, the retainer includes a retainer main body, which is made of synthetic resin, and a deformation preventing member, which is made of metal and is connected to the retainer main body. Therefore, the retainer for a bearing disclosed in Patent Literature 5 enhances the rigidity of the retainer, similarly to the crown-shaped retainer for a ball bearing disclosed in Patent Literature 4. Further, there has hitherto been proposed a retainer which is reduced in inner diameter to decrease the weight so that the centrifugal force is controlled.

CITATION LIST

Patent Literature 1: JP 4636035 B2
Patent Literature 2: JP 2009-281399A

Patent Literature 3: JP 4424092 B2
Patent Literature 4: JP 2011-117609 A
Patent Literature 5: JP 2007-285506 A

SUMMARY OF INVENTION

Technical Problem

According to the retainer disclosed in Patent Literature 1, it is required that the retainer be inclined radially inward from the annular portion toward the distal end portions of the columnar portions by a predetermined amount of deformation caused by the centrifugal force in advance. Therefore, the productivity is degraded. Further, there is a case where an actual amount of deformation and an assumed amount of deformation do not match, with the result that the function is not stable.

Further, according to the retainers disclosed in Patent Literature 2, Patent Literature 4, and Patent Literature 5, a large number of components are used, with the result that the productivity is degraded, and the high cost is involved. Further, according to the retainer disclosed in Patent Literature 2, lubrication with grease may reduce a volume of a space, with the result that there is a disadvantage in an aspect of lifetime.

According to the retainer disclosed in Patent Literature 3, portions having grooves formed therein are limited to the radially inner portion. Therefore, when significant delay or advance of balls occurs during rotation, a contact area between the retainer and each rolling element is not reduced, with the result that there is a fear of increase in heat generation. Further, no measure is taken with respect to the influence of the centrifugal force. Therefore, the increase in diameter of the retainer is promoted by the amount of reduction of the radially inner portions of the pockets by the grooves, with the result that movement of the rolling elements is unstable. Therefore, the radially outer portion of the retainer may be brought into contact with the radially inner portion of the outer ring, with the result that heat generation may be increased. Further, the retainer having a configuration for controlling the centrifugal force may be reduced in strength of the retainer.

In view of the above-mentioned problems, the present invention provides a retainer for a bearing, which suppresses the influence of deformation due to high-speed rotation, improves a state of lubrication with grease, and achieves longer lifetime, and a bearing using such a retainer.

Solution to Problem

According to one embodiment of the present invention, there is provided a retainer for a bearing, the retainer being entirely formed into an annular shape and having a crown shape, the retainer comprising pockets which are formed at a plurality of locations in a circumferential direction of the retainer and are each opened on a radially outer side of the retainer and a radially inner side of the retainer, the pockets retaining balls being rolling elements so that the balls are rollable, the retainer having a grease flow-in passage provided between an inner surface of each of the pockets and each of the balls.

With the retainer for a bearing according to one embodiment of the present invention, even when the balls being the rolling elements are brought closer by high-speed rotation, grease flows into a portion between the inner surface of each of the pockets and each of the balls through the grease flow-in passage, thereby being capable of preventing loss of oil film.

The grease flow-in passage may comprise a groove formed in the inner surface of the each of the pockets, or a protrusion formed in the inner surface of the each of the pockets. Further, it is preferred that the grease flow-in passage be formed at a maximum speed portion at which a ball rotation speed is maximum.

It is preferred that the retainer have an interpocket portion subjected to thinning of reducing a retainer axial thickness, and that, when a retainer axial thickness of the interpocket portion is "a", a retainer axial thickness of an inner surface bottom corresponding portion of the each of the pockets is "b", and a dimension from a thinned end surface of the interpocket portion to the maximum speed portion is "c", a>b and c>0 be satisfied.

The retainer axial thickness of the inner surface bottom corresponding portion of the each of the pockets may be set to from 1/70 to 1/30 of a retainer PCD, and the retainer axial thickness between the pockets may be set to from 1/62 to 1/26 of the retainer PCD. The retainer PCD is a pitch circle diameter of an imaginary circle which is formed of centers of the pockets arranged successively along the circumferential direction.

A generated stress caused by the centrifugal force is concentrated on a bottom of a retainer pocket portion. Thus, during the high-speed rotation, a certain amount of thickness is required at an inner surface bottom corresponding portion of each pocket, and the retainer axial thickness needs to be equal to or more than 1/70 in comparison with the PCD. Further, it is assumed that the retainer is lubricated with grease, and hence a shield or a seal is required. However, the interference between the sealing member and the retainer may cause heat generation. Therefore, it is desired that the retainer be driven in non-contact with the sealing member. Accordingly, the retainer axial thickness of the inner surface bottom corresponding portion of each pocket needs to be equal to or less than 1/30 in comparison with the PCD.

Further, the generated stress caused by the centrifugal force is concentrated on the bottom of the retainer pocket portion, and generation of a weld is inevitable because the retainer has an annular shape. Therefore, in consideration of the structure, it is necessary to employ the design of bringing the weld to each interpocket portion. A strength reduction rate of the weld portion in a case of engineering plastic such as PA9T is about 1/3.5 at maximum in comparison with a non-weld portion. Meanwhile, when a retainer axial thickness of each interpocket portion is "a", and a retainer axial thickness of each pocket bottom portion is "b", a stress difference which occurs between the pocket bottom portion and the interpocket portion is almost a:b=1:4. Thus, the thickness required in view of the weld strength is a≤b×3.5. However, in consideration of the thickness required in view of the generated stress, the required thickness is a≥b×3.5/4. Therefore, "a" is set to from 1/(70×0.875) to 1/(30×0.875), that is, from 1/62 to 1/26 in comparison with the retainer PCD.

The retainer may be made of a resin material comprising carbon fibers as a reinforcement material, and a retainer material may also comprise engineering plastic. The engineering plastic is synthetic resin of a type which is particularly excellent in thermal resistance and can be used in a field which requires strength. Further, resin which is further increased in thermal resistance and strength is called "super engineering plastic", and the super engineering plastic may be used.

According to one embodiment of the present invention, there is provided a bearing, comprising the above-mentioned retainer for a bearing.

Advantageous Effects of Invention

According to the present invention, the loss of oil film can be prevented, and hence generation of abrasion powder or abnormal heat generation can be prevented, thereby being capable of suppressing degradation of grease and achieving longer lifetime.

The grease flow-in passage is configured to prevent the loss of oil film due to contact of the rolling elements with respect to the retainer, which is caused by the centrifugal force. Therefore, the grease flow-in passage can be formed of a groove formed in an inner surface of the pocket or can be formed of a protrusion formed on the inner surface of the pocket, thereby being excellent in designability.

When the grease flow-in passage is formed in a maximum speed portion at which a ball rotation speed is maximum, the loss of oil film can effectively be prevented, thereby being capable of achieving longer lifetime.

When thinning of reducing the retainer axial thickness is performed with respect to each interpocket portion, weight can be reduced. Further, when a>b and c>0 are satisfied, reduction in retainer annular strength can be prevented. That is, weight can be reduced while securing the strength of the retainer. Through the reduction in weight, the deformation caused by the centrifugal force can be reduced, thereby being capable of preventing interference with other components, breakage of the retainer itself, and the like.

The retainer axial thickness of the inner surface bottom corresponding portion of each pocket is set to from $1/70$ to $1/30$ of the retainer PCD. Therefore, the rigidity of this portion can be secured, thereby being capable of effectively preventing the deformation of this portion also during the high-speed rotation. Further, the interference with the sealing member configured to seal the annular space of the bearing can be prevented, thereby being capable of effectively preventing heat generation caused by the interference.

The retainer axial thickness of the interpocket portion is set to from $1/62$ to $1/26$ of the retainer PCD, thereby being capable of securing the strength of the interpocket portion being the weld portion.

The retainer is stabilized in strength and achieves excellent durability as long as the retainer is made of a resin material using carbon fibers as a reinforcement material. In particular, when the engineering plastic is used as the retainer material, excellent strength is achieved.

With the bearing using the above-mentioned retainer for a bearing, durability is excellent even when the bearing is used in high-speed rotation, thereby being capable of achieving longer lifetime. Therefore, the bearing is most suitable for use in electric motors of the EV, HEV, and the like, which are used in high-speed rotation. Further, when the bearing capable of achieving such long lifetime is formed, it is only necessary that the retainer be changed, thereby being capable of achieving excellent productivity and suppression of rise in cost.

DESCRIPTION OF EMBODIMENTS

Figure 1:
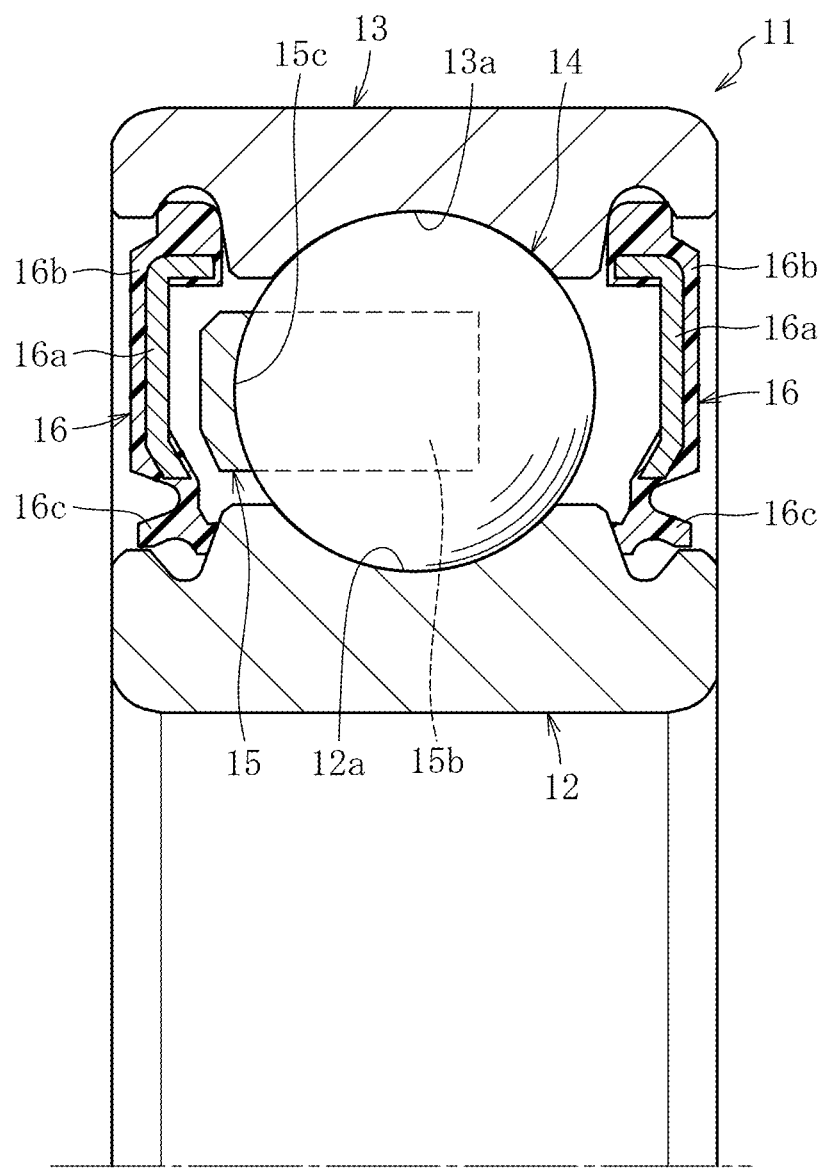
FIG. 1 is a sectional view of main components of a bearing according to an embodiment of the present invention.

Now, description is made of embodiments of the present invention with reference to FIG. 1 to FIG. 9. FIG. 1 is an illustration of a bearing according to the present invention. The bearing mainly comprises an inner ring 12, an outer ring 13, a plurality of balls 14, and a retainer 15. The inner ring 12 has an inner raceway surface 12a formed in a radially outer surface of the inner ring 12. The outer ring 13 is arranged on an outer side of the inner ring 12 and has an outer raceway surface 13a formed in a radially inner surface of the outer ring 13. The plurality of balls 14 are interposed between the inner raceway surface 12a of the inner ring 12 and the outer raceway surface 13a of the outer ring 13 so as to be rollable. The retainer 15 made of resin is arranged between the inner ring 12 and the outer ring 13 and is configured to retain the balls 14 at equal intervals in a circumferential direction of the retainer 15. Any one of the outer ring 13 and the inner ring 12 is mounted to a stationary portion such as a housing, and another one of the outer ring 13 and the inner ring 12 is mounted to a rotary portion such as a rotary shaft.

Figure 2:
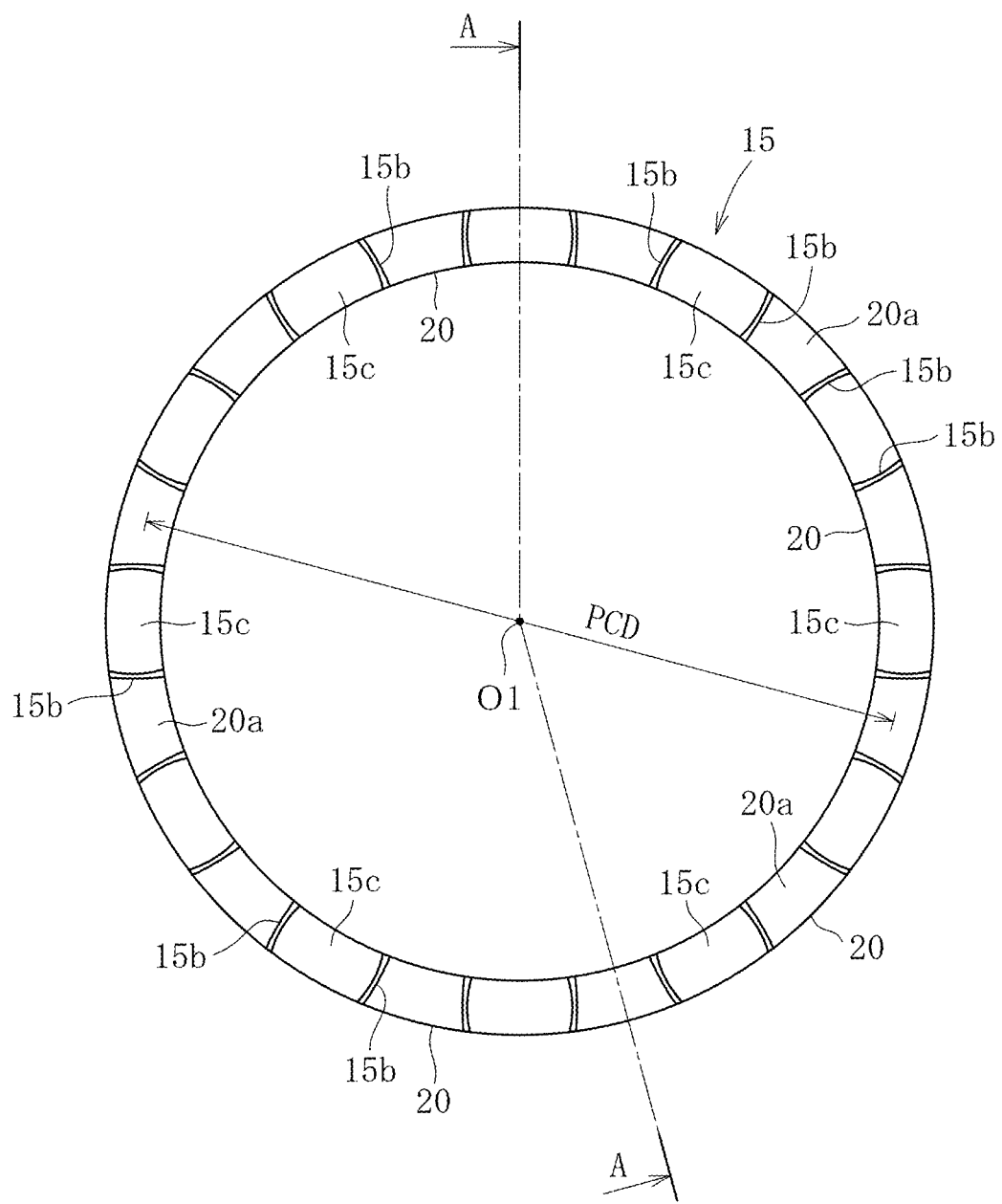
FIG. 2 is a plan view of a retainer according to the embodiment of the present invention.

As illustrated in FIG. 2, the retainer 15 having a crown shape, which is arranged between the inner ring 12 and the outer ring 13, comprises a main portion 15a and pairs of elastic pieces 15b. The main portion 15a has an annular shape. The pairs of elastic pieces 15b are integrally formed on one surface of the main portion 15a in an axial direction of the retainer 15 at equal intervals in the circumferential direction. The retainer 15 has pockets 15c, which are each formed so as to recess between each pair of elastic pieces 15b and are each opened on a radially outer side and a radially inner side of the retainer 15. The balls 14 are retained in the pockets 15c so as to be rollable.

The retainer 15 may be made of a resin material comprising carbon fibers as a reinforcement material and the retainer material may comprise engineering plastic. When the carbon fibers are used, the carbon fibers may be long fibers or short fibers. The engineering plastic is synthetic resin of a type which is particularly excellent in thermal resistance and can be used in a field which requires strength.

Further, resin which is further increased in thermal resistance and strength is called "super engineering plastic", and the super engineering plastic may be used.

Examples of the engineering plastics include polycarbonate (PC), polyamide 6 (PA6), polyamide 66 (PA66), polyacetal (POM), modified polyphenylene ether (m-PPE), polybutylene terephthalate (PBT), GF-reinforced polyethylene terephthalate (GF-PET), and ultra high molecular weight polyethylene (UHMW-PE). Further, examples of the super engineering plastics include polysulfone (PSF), polyether sulfone (PES), polyphenylene sulfide (PPS), polyarylate (PAR), polyamideimide (PAI), polyetherimide (PEI), polyetheretherketone (PEEK), liquid crystal polymer (LCP), thermoplastic polyimide (TPI), polybenzimidazole (PBI), polymethylpentene (TPX), poly(1,4-cyclohexanedimethylene terephthalate) (PCT), polyamide 46 (PA46), polyamide 6T (PA6T), polyamide 9T (PA9T), polyamide 11, 12 (PA11, 12), fluororesins, and polyphthalamide (PPA).

Further, as illustrated in FIG. 1, on both sides of the inner ring 12 and the outer ring 13 in the axial direction, there are arranged sealing members 16 configured to seal an annular space formed between the inner ring 12 and the outer ring 13. Each sealing member 16 comprises a core 16a and an elastic member 16b. The elastic member 16b integrally adheres to the core 16a through vulcanization. A base end portion of each sealing member 16 is mounted to a radially inner end portion of the outer ring 13, and a distal end portion of each sealing member 6 has a seal lip 16c held in contact with a radially outer end portion of the inner ring 12. In the ball bearing 11 illustrated in FIG. 1, the outer ring 13 to which the base end portions of the sealing members 16 are mounted is on a stationary side, and the inner ring 12 with which the seal lips 16c are held in contact is on a rotary side.

During operation of the ball bearing 11, the inner ring 12 is rotated while maintaining a state in which the seal lips 16 formed at the distal ends of the sealing members 16 are held in slide contact with the radially outer end portion of the inner ring 12. With this action, entry of foreign matters such as water and dust into the bearing or leakage of a lubricant such as grease from an inside of the bearing to an outside is prevented.

Incidentally, the grease is a semisolid lubricant comprising a base oil, a thickener, and an additive, and suitable grease needs to be selected for intended use based on combinations of the base oil, thickener, and additive. In general, mineral oil is used for the base oil in many cases. However, synthetic oils such as silicone oil, diester oil, and fluorine oil are also used for the purpose of improving heat resistance and low temperature fluidity. The thickener may be a metal soap-based thickener, a non-metal soap-based thickener, a composite thickener, or the like, and affects the properties such as mechanical stability, water resistance, and an operating temperature range. The additive may be an extreme-pressure additive, an antioxidant, a rust inhibitor, or the like. The extreme-pressure additive improves properties against impact load and heavy load. The antioxidant prevents degradation due to oxidation in a case where supply is absent for a long period of time. The rust inhibitor prevents rust generated in a bearing or surroundings of the bearing.

Figure 4A:
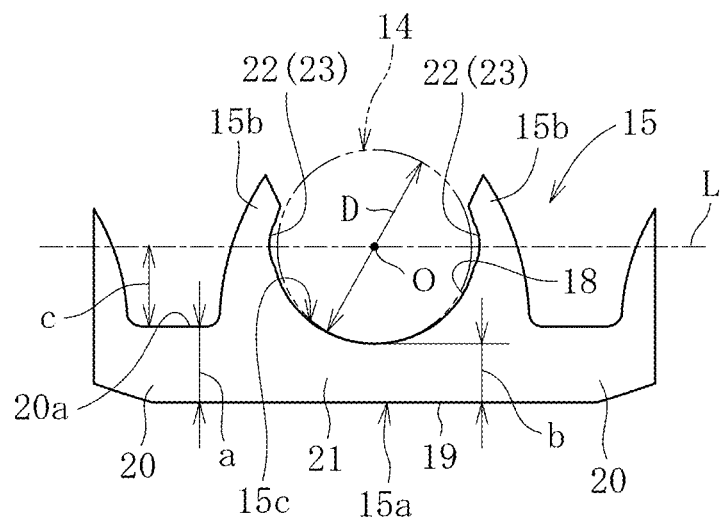
FIG. 4A is a sectional view taken along the line B-B of FIG. 3 and is an illustration of a relationship of a thickness of the retainer.
Figure 12A:
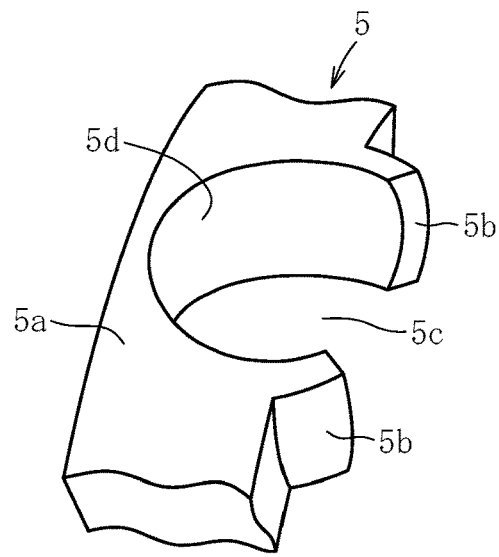
FIG. 12A is a perspective view of main components of a retainer of the related-art bearing.
Figure 12B:
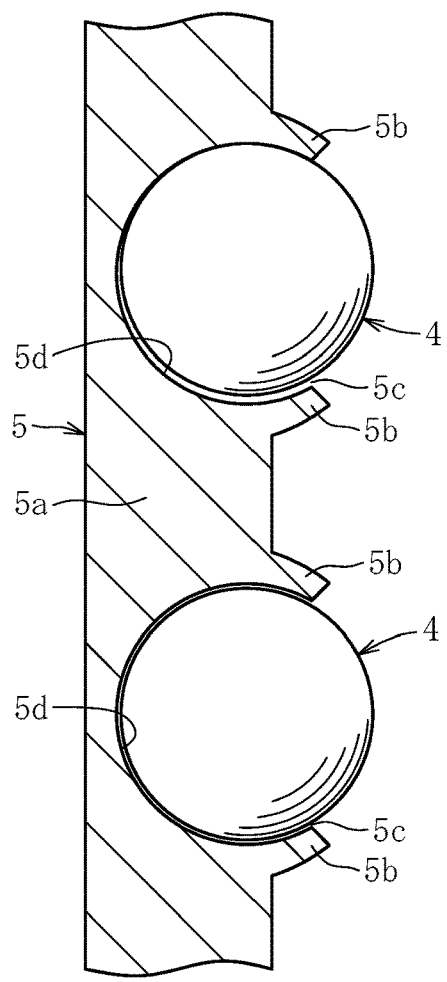
FIG. 12B is an expanded view of the main components of the retainer of the related-art bearing.

The retainer 15 is subjected to thinning of reducing the retainer axial thickness of each interpocket portion 20 between pockets 15c and 15c, which are adjacent to each other in the circumferential direction, to be less than that of the related-art retainer illustrated in FIG. 12A and FIG. 12B. In this case, as illustrated in FIG. 4A, when the retainer axial thickness of each interpocket portion 20 is "a", and the retainer axial thickness of each inner surface bottom corresponding portion 21 of the pocket 15c is "b", a>b is satisfied. For example, a:b=1.5 to 3.0:1 is approximately satisfied.

Figure 3:
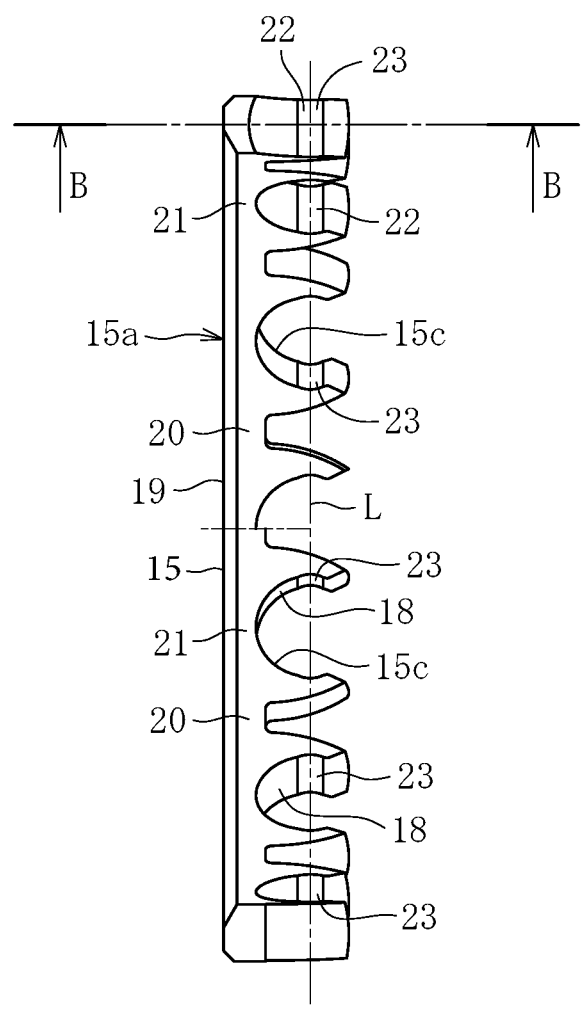
FIG. 3 is a sectional view taken along the line A-O1-A of FIG. 2.
Figure 4B:
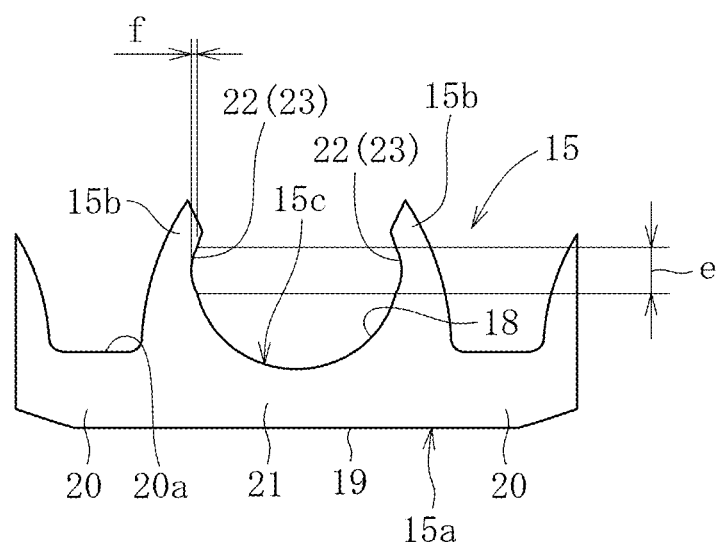
FIG. 4B is a sectional view taken along the line B-B of FIG. 3 and is an illustration of a dimension of a grease flow-in passage of the retainer.
Figure 5:
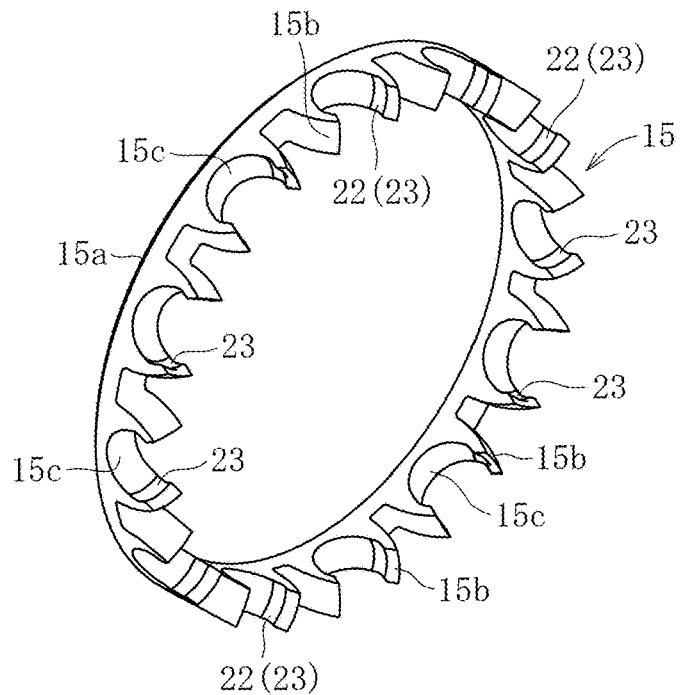
FIG. 5 is a perspective view of the retainer.

Further, as illustrated in FIG. 3 to FIG. 5, pocket inner surfaces 18 of the retainer 15, that is, inner surfaces of the elastic pieces 15b have grooves 23 and 23 forming grease flow-in passages 22. Each of the grooves 23 and 23 has a bottom surface cross-sectional shape of a flat arcuate surface. When one pocket 15c is viewed radially inward from an outer circumferential side, as illustrated in FIG. 4A and FIG. 4B, the pocket 15C has a partially omitted circular shape. The grooves 23 and 23 are arranged on a straight line, which passes through a center O of the circle and is parallel to a retainer bottom surface (surface on a side opposite to the elastic pieces). That is, the grooves 23 and 23 are formed on a circular track L, which is parallel to the retainer bottom surface (surface on a side opposite to the elastic pieces) 19, and extend along the radially inner surfaces of the elastic pieces 15b from a radially inner side to a radially outer side or from the radially outer side to the radially inner side. A maximum speed portion is on the circular track L.

When a width dimension (retainer axial dimension) of each groove 23 is "e" (see FIG. 4B), and a ball diameter is "D" (see FIG. 4A), D:e=3.8 to 4.6:1 is approximately satisfied. Further, when a depth of the groove 23 is "f" (see FIG. 4B), e:f=7 to 9:1 is approximately satisfied. With such settings, even when the ball is brought into contact with the groove 23 side, the groove 23 forms a space with the ball 14, thereby being capable of forming the grease flow-in passage 22. Further, when a dimension from a thinned end surface 20a of the interpocket portion 20 to the maximum speed portion (circular track L) is "c" (see FIG. 4A), c>0 is satisfied.

Incidentally, it is preferred that the "b" be set to from 1/70 to 1/30 of the retainer PCD (see FIG. 2). A generated stress caused by the centrifugal force is concentrated on a bottom of a retainer pocket portion. Thus, during the high-speed rotation, a certain amount of thickness is required at an inner surface bottom corresponding portion of each pocket, and a retainer axial thickness needs to be equal to or more than 1/70 in comparison with the PCD. Further, it is assumed that the retainer is lubricated with grease, and hence the sealing members 16 are required as illustrated in FIG. 1. However, the interference between each sealing member 16 and the retainer 15 may cause heat generation. Therefore, it is desired that the retainer be driven in non-contact with the sealing members 16. Accordingly, the retainer axial thickness of the inner surface bottom corresponding portion of each pocket 15c needs to be equal to or less than 1/30 in comparison with the PCD. The retainer PCD is a pitch circle diameter of an imaginary circle which is formed of centers of the pockets 15c arranged successively along the circumferential direction.

Further, the generated stress caused by the centrifugal force is concentrated on the bottom of the retainer pocket portion, and generation of a weld is inevitable because the retainer 15 has an annular shape. Therefore, in consideration of the structure, it is necessary to employ the design of bringing the weld to each interpocket portion 20 of the retainer 15.

Figure 10:
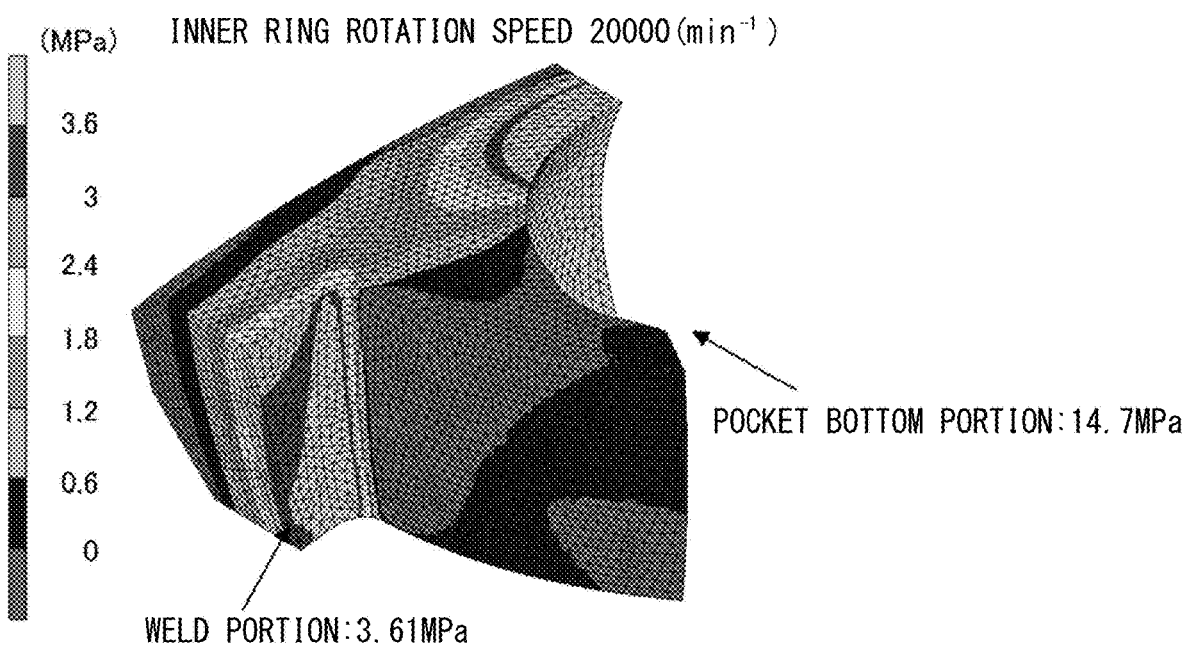
FIG. 10 is a view for illustrating stress distribution in main components of the retainer.
Figure 11:
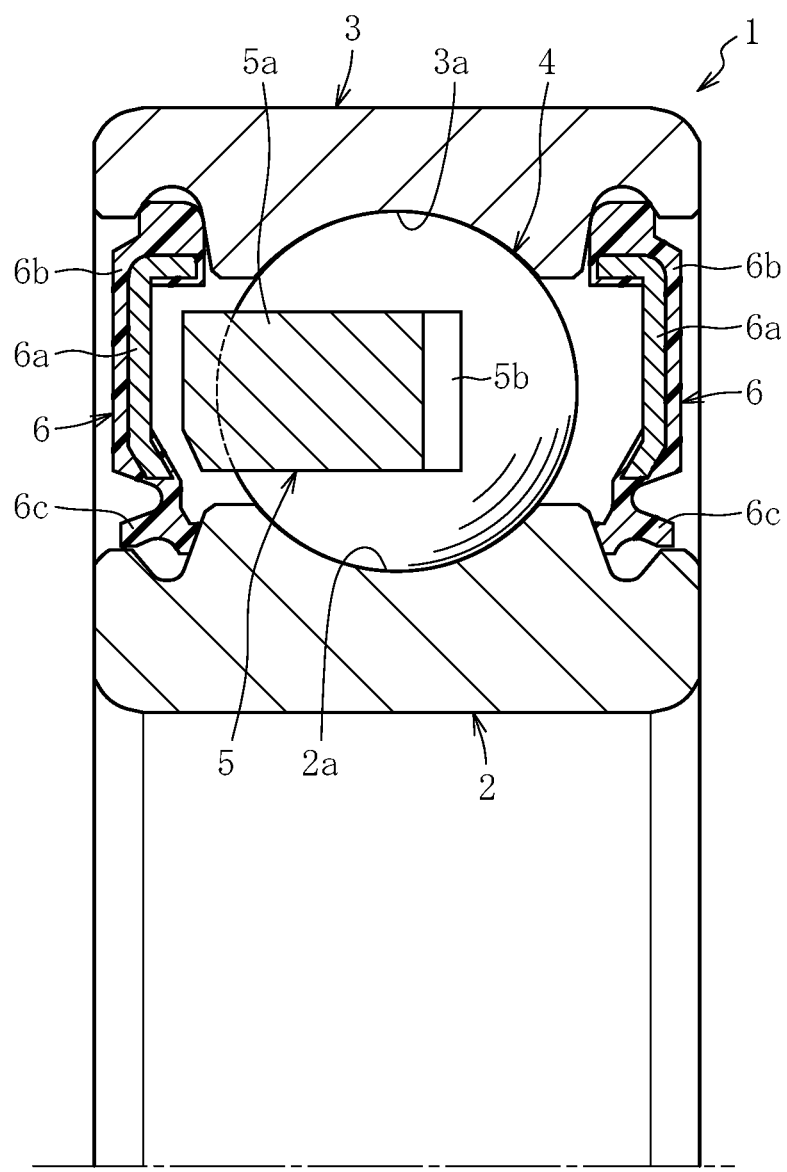
FIG. 11 is a sectional view of main components of a related-art bearing.

Incidentally, the strength reduction rate of the interpocket portion 20 being the weld portion is apparent from the weld strength experiment result (stress portion distribution map) illustrated in FIG. 10. In this case, polyamide 9T (PA9T) being one of super engineering plastic is used for the retainer 15. The strength reduction rate of the weld portion is about 1/3.5 in comparison with a non-weld portion. Meanwhile, the stress difference which occurs between each pocket bottom portion and each interpocket portion 20 is almost a:b=1:4 according to a result of analysis in a case of a=b. Thus, the thickness required in view of the weld strength is a≤b×3.5. However, in consideration of the thickness required in view of the generated stress, the required thickness is a≥b×3.5/4. Therefore, "a" is set to from 1/(70×0.875) to 1/(30×0.875), that is, from 1/62 to 1/26 in comparison with the retainer PCD.

Even when the balls 14 being rolling elements are brought closer by high-speed rotation, grease flows into a portion between each inner surface 18 of the pocket 15c and each ball 14 through the grease flow-in passage, thereby being capable of preventing loss of oil film. Therefore, generation of abrasion powder or abnormal heat generation can be prevented, thereby being capable of suppressing degradation of grease and achieving longer lifetime. Therefore, the bearing using the retainer according to the present invention is most suitable for use in a motor main shaft of the EV, HEV, and the like, which is used in high-speed rotation.

When thinning of reducing the retainer axial thickness is performed with respect to each interpocket portion 20, weight can be reduced. Further, when a>b and c>0 are satisfied, reduction in retainer annular strength can be prevented. That is, weight can be reduced while securing the strength of the retainer 15. The influence of the centrifugal force can be reduced through reduction in weight by reducing the retainer axial thickness of each interpocket portion 20 (thinning) as much as possible. However, there is a fear in that the annular strength is reduced. Therefore, it is preferred that the relationship of a>b be maintained and that c>0 be satisfied.

The retainer axial thickness of the inner surface bottom corresponding portion 21 of each pocket 15c is set to from 1/70 to 1/30 of the retainer PCD. Therefore, the rigidity of this portion can be secured, thereby being capable of effectively preventing the deformation of this portion also during the high-speed rotation. Further, the interference with the sealing member configured to seal the annular space of the bearing can be prevented, thereby being capable of effectively preventing heat generation caused by the interference.

The retainer axial thickness of the interpocket portion 20 is set to from 1/62 to 1/26 of the retainer PCD, thereby being capable of securing the strength of the interpocket portion 21 being the weld portion.

The retainer 15 is stabilized in strength and achieve excellent durability as long as the retainer 15 is made of a resin material using carbon fibers as a reinforcement material. In particular, when the engineering plastic is used as the retainer material, excellent strength is achieved.

Figure 6:
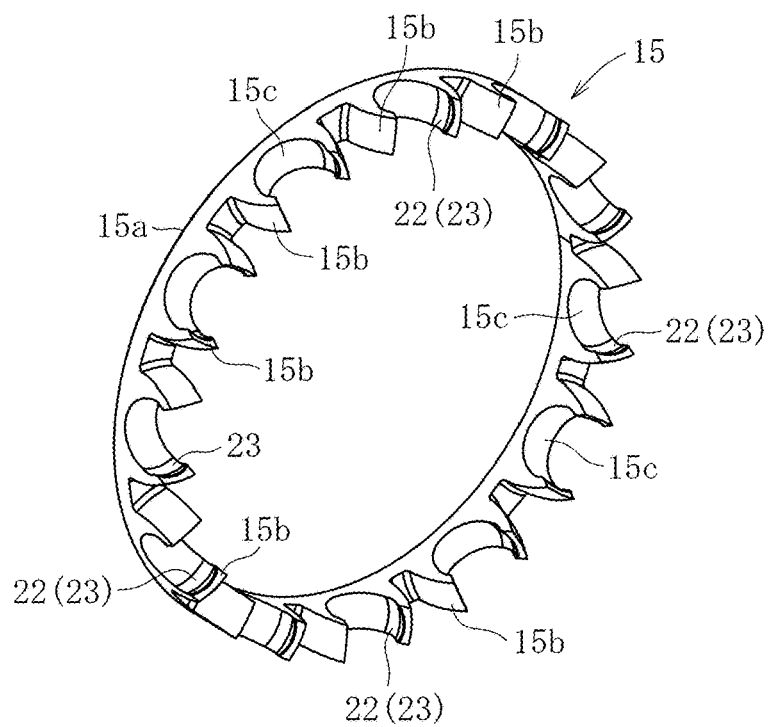
FIG. 6 is a perspective view of a first modification example of the retainer.
Figure 7:
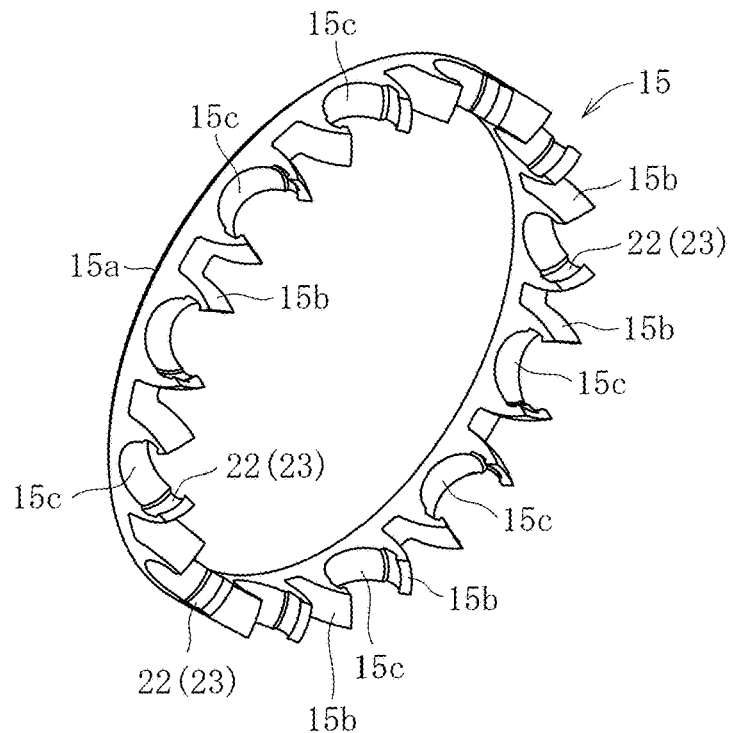
FIG. 7 is a perspective view of a second modification example of the retainer.
Figure 8:
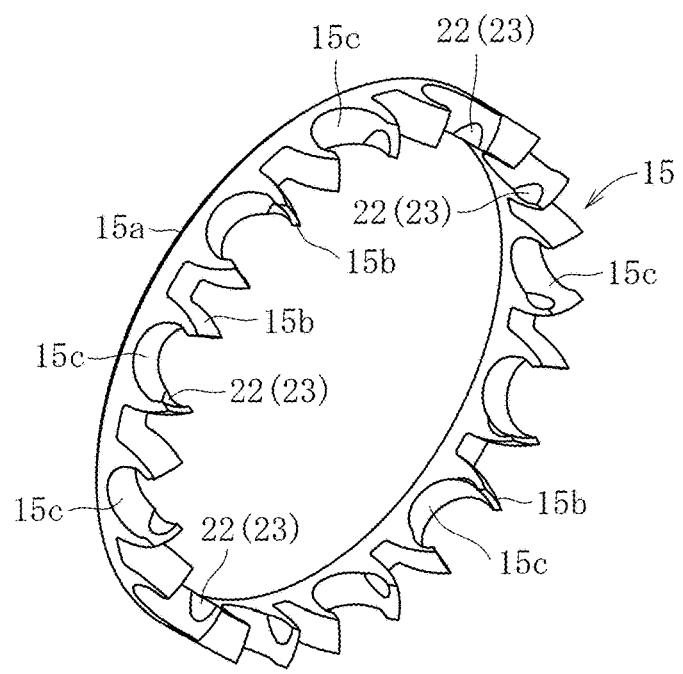
FIG. 8 is a perspective view of a third modification example of the retainer.

FIG. 6 to FIG. 8 are illustrations of modification examples of the groove 23. In FIG. 6, the groove 23 has a cross-sectional shape of a flat triangular shape. In FIG. 7, the groove 23 has a cross-sectional shape of a trapezoidal shape. Each of the grooves 23 illustrated in FIG. 5 to FIG. 7 is opened on the retainer radially inner surface and the retainer radially outer surface. However, the groove 23 illustrated in FIG. 8 has a shape of being opened on the retainer radially inner surface but not opened on the retainer radially outer surface. The groove 23 illustrated in FIG. 8 has a cross-sectional shape of an arcuate shape.

Also in the grooves 23 illustrated in FIG. 6 to FIG. 8, even under a state in which the balls 14 being rolling elements are brought closer, the grease flows into a portion between each inner surface 18 of the pocket 15c and each ball 14 through the grease flow-in passage 22, thereby being capable of preventing the loss of oil film. With this configuration, the action and effect which are the same as those of the groove 23 illustrated in FIG. 5 or the like can be achieved.

Figure 9:
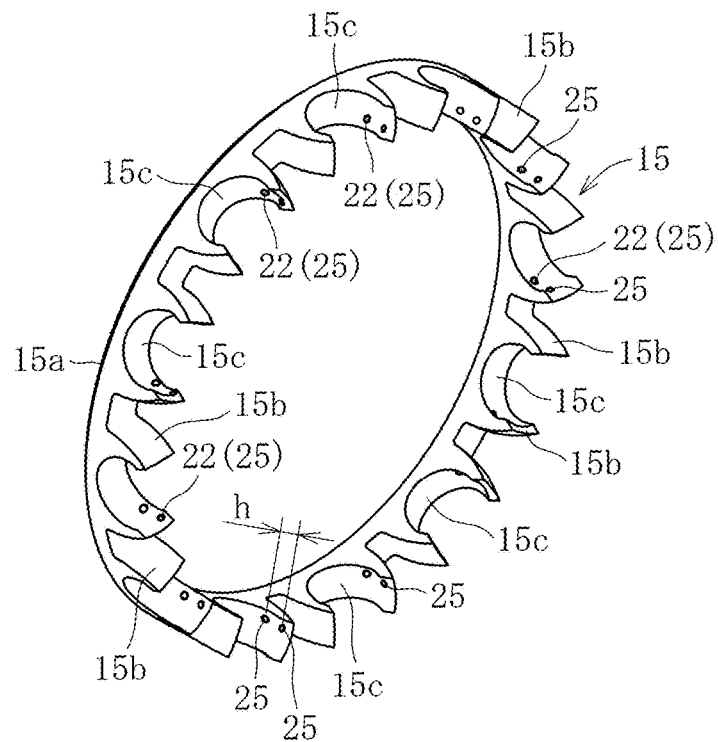
FIG. 9 is a perspective view of a retainer according to another embodiment of the present invention.

Next, in FIG. 9, protrusions 25 are formed in place of the grooves 23. In this case, at the position of each elastic piece 15b at which the groove 23 is formed, that is, at the maximum speed portion at which the ball rotation speed is maximum, two protrusions 25 are formed at a predetermined interval along the axial direction of the retainer.

Even when the protrusions 25 are formed in place of the grooves 23 as described above, a gap can be formed between each inner surface of the pocket 15c and each ball 14, thereby forming the grease flow-in passage 22. An interval h of the protrusions 25 on each elastic piece 15b substantially matches with the "e" illustrated in FIG. 4B. Further, it is only necessary that a height dimension of each protrusion 25 (amount of protrusion from the pocket inner surface) be set so that a gap which is capable of constructing the grease flow-in passage 22 can be formed.

Therefore, each protrusion 25 may be formed into a short columnar body, a semi-spherical shape, a conical shape, a polygonal pyramid shape, or the like. Further, the interval h of the protrusions 25 is not limited to the "e" illustrated in FIG. 4B.

As described above, the grease flow-in passage 22 can be formed of the groove 23 formed in the inner surface 18 of the pocket 15c or can be formed of the protrusions 25 formed on the inner surface 18 of the pocket 15c, thereby being excellent in designability.

In the above, description is made of the embodiments of the present invention. However, the present invention is not limited to the above-mentioned embodiments, and various modifications can be made. The number of pockets 15c of the retainer 15 may be variously changed in accordance with the number of balls which are to be retained. Further, the dimensions a, b, c, e, f, and the like may be variously changed in accordance with a material which is to be used. Further, with the retainer 15 according to the present invention, even when the balls 14 being rolling elements are brought closer by high-speed rotation, the grease flows into a portion between each inner surface 18 of the pocket 15c and each ball 14 through the grease flow-in passage 22, thereby being capable of preventing loss of oil film. Therefore, the bearing using the retainer is most suitable for use in electric motors of the EV, HEV, and the like, which is used in high-speed rotation.

INDUSTRIAL APPLICABILITY

The bearing is suitable for the electric motors of the EV, HEV, and the like, which is used in high-speed rotation. However, the bearing is not limited for use in the EV and HEV, and may also be used for other uses, for example, for supporting a main shaft or the like of a machine tool.

The invention claimed is:

1. A retainer for a bearing, the retainer being entirely formed into an annular shape and having a crown shape, the retainer comprising:
   pockets formed at a plurality of locations in a circumferential direction of the retainer, each of the pockets being opened on a radially outer side of the retainer and a radially inner side of the retainer, the pockets configured to retain balls so that the balls are rollable, the balls being rolling elements; and
   a grease flow-in passage provided between an inner surface of each of the pockets and each of the balls, wherein each of the grease flow-in passages comprises a groove formed in the inner surface of one of the pockets, wherein an entire area of each of the grooves has an arcuate shape in cross section, wherein the grease flow-in passages are formed at a maximum speed portion of the pockets at which a ball rotation speed is at a maximum, and wherein, when a diameter of each of the balls is "D", a width dimension of each of the grooves is "e", and a depth of each of the grooves is "f", D:e=3.8 to 4.6:1 and e:f=7 to 9:1 are satisfied.

2. The retainer for a bearing according to claim 1, wherein the retainer has an interpocket portion subjected to thinning by reducing a retainer axial thickness, and wherein, when the retainer axial thickness of the interpocket portion is "a", a retainer axial thickness of an inner surface bottom corresponding portion of each of the pockets is "b", and a dimension from a thinned end surface of the interpocket portion to the maximum speed portion is "c", a>b and c>0 are satisfied.

3. The retainer for a bearing according to claim 1, wherein the retainer is made of a resin material comprising carbon fibers as a reinforcement material.

4. The retainer for a bearing according to claim 1, wherein a retainer material of the retainer comprises engineering plastic.

5. A bearing, comprising a retainer according to claim 1.

* * * * *